United States Patent [19]

Krezak et al.

[11] 4,125,029
[45] Nov. 14, 1978

[54] WHEELED VEHICLE MOVING APPARATUS

[75] Inventors: John E. Krezak, Claymont, Del.; John R. Matics, Brookhaven, Pa.

[73] Assignee: The Boeing Company, Seattle, Wash.

[21] Appl. No.: 838,325

[22] Filed: Sep. 30, 1977

[51] Int. Cl.² .............. F16H 37/00; F16H 13/02; B60K 17/00
[52] U.S. Cl. ............................ 74/13; 74/206; 180/14 C; 180/74
[58] Field of Search .......... 180/74, 14 C, 6.44; 74/421, 63, 13, 206

[56] References Cited

U.S. PATENT DOCUMENTS

| 2,757,619 | 8/1956 | Beemer et al. | 74/13 X |
|---|---|---|---|
| 3,923,112 | 12/1975 | Goodgame | 180/74 X |
| 3,930,548 | 1/1976 | Wallraff | 180/74 X |
| 3,937,290 | 2/1976 | Benning | 180/14 C |

*Primary Examiner*—Leonard H. Gerin
*Attorney, Agent, or Firm*—Felix J. D'Ambrosio; Edwin E. Greigg; Jack D. Puffer

[57] ABSTRACT

An apparatus for moving a wheeled vehicle which can be positioned, controlled and operated by a single individual. The apparatus operates on one wheel of the wheeled vehicle and moves the vehicle by rotating the one wheel. The apparatus includes a drive which engages both the wheel and the surface along which the vehicle is moved and an idler roller which also engages the wheel. The idler roller in its engagement with the wheel produces a reaction force for the apparatus which reacts the driving torque input to the drive. The idler roller produces the essential effect needed to accomplish the one-man operation noted above.

13 Claims, 3 Drawing Figures

WHEELED VEHICLE MOVING APPARATUS

BACKGROUND OF THE INVENTION

A. Field of the Invention

This invention relates generally to vehicle movement, and in particular to an apparatus for moving a wheeled vehicle.

B. General Discussion

This invention was developed by us in response to a need which arose during production of the standard light rail vehicle being manufactured by the surface transportation systems group of the assignee company. The standard light rail vehicle is a mass transit tracked vehicle with an undercarriage which carries a coach or body. In the assembly of these vehicles a need arose for moving the undercarriages in particular, and even the assembled vehicle, between assembly stations. Moving these vehicles on the assembly-line, however, requires consideraable manpower, improvisation of available facilities and equipment, and removal and/or replacement of obstructions (work platforms, wiring connections, air lines, etc.) from the aisles to permit usage of equipment. All this substantially increases the man hours (beyond normal moving time) required to move the vehicles. The problem is complicated further by the fact that these vehicles weigh approximately 70,000 pounds, a significant portion of which is made up by the undercarriage.

We are aware of tow trucks used in the aviation industry for moving aircraft to, for example, a maintenance hangar. These tow trucks, however, are not suited for use on an assembly line because they must be kept in a remote area and transported to the assembly line. Even more importantly, however, is the fact that the space requirements on an assembly line simply preclude using these trucks.

We determined that the apparatus should be simple, compact, relatively light in weight, easy to install on and remove from the vehicle and easily managable for controlling movement of the vehicle.

OBJECTS AND SUMMARY OF THE INVENTION

Among the objects of the invention, the following are noted:

1. An apparatus for moving a wheeled vehicle which can be used on an assembly line with its confined spaces.
2. An apparatus for moving a wheeled vehicle which can be positioned, controlled and operated by a single individual.
3. An apparatus for moving a wheeled vehicle which is compact, light in weight, relatively simple in design and able to both move and stop the wheeled vehicle at any desired assembly-line station.

We determined that an apparatus with a wheel for engaging the surface along which the vehicle is to move, a wheel for engaging a wheel of the vehicle rather than the vehicle itself and a power source for imparting a torque to the surface engaging wheel were necessary. We did not achieve all our objects, however, until we added an idler roller for engaging the wheel of the wheeled vehicle, a gear set for transmitting the torque from the surface engaging wheel (drive wheel) to the vehicle engaging wheel (friction wheel) and a brake. The idler roller performs the crucial function of reacting in a very effective manner the input drive torque to the apparatus using the vehicle wheel itself. Without this idler roller it is difficult, if not impossible, for the average person to operate the apparatus because the reactive torque (which is quite high for moving the vehicles of the size and weight referred to above) must be supplied by the individual.

PRIOR ART

We are aware of the following U.S. Pat. Nos. bearing on the subject matter of the present invention:

1,712,334; 2,920,845; 2,989,007; 3,025,922; 3,063,512; 3,120,741; 3,251,313; 3,653,330; 3,826,198; 3,826,324; and 3,937,290. These patents were found during a search conducted to determine the novelty of the above-noted features of the invention. They are considered representative of the state-of-the-art. It is immediately apparent that none of these patents disclose an arrangement with an idler roller for engaging the vehicle wheel. None have the simplicity of design of the invention, and none have the wheel brake block of the invention.

DETAILED DESCRIPTION OF THE PREFERRED EMBODIMENT

Figure 1:
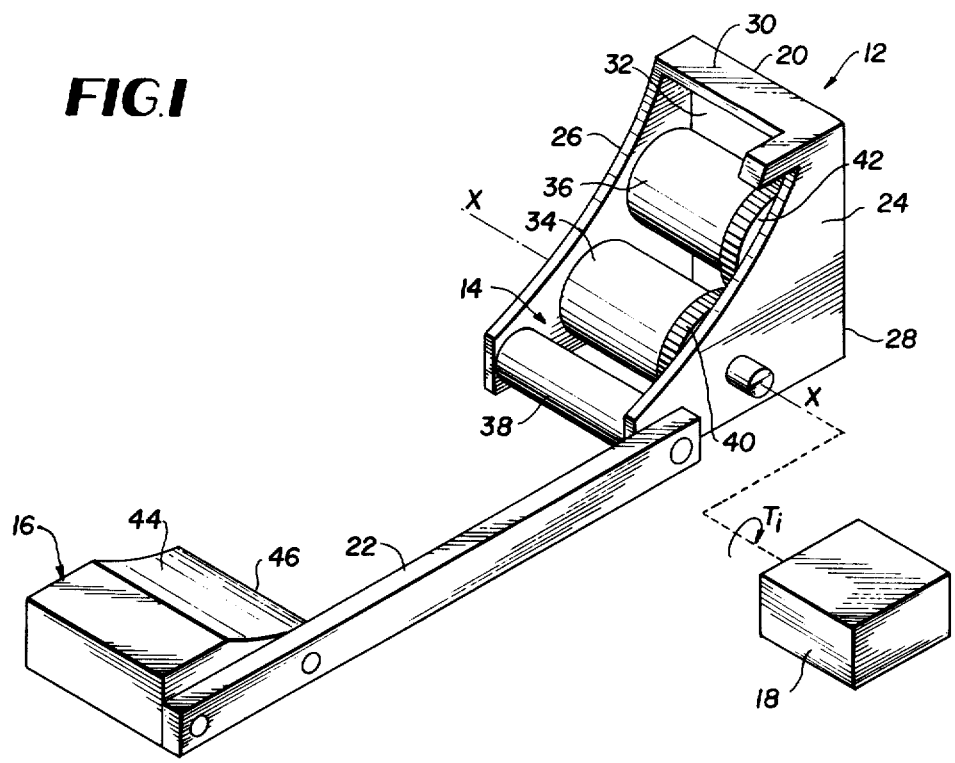
FIG. 1 is a perspective view of the apparatus of the invention.

Turning to FIG. 1, the apparatus according to the invention is shown in assembly by the reference numeral 10. The apparatus 10 includes in its essential elements a housing 12, a drive 14, a wheel brake block 16 and a power source 18.

The housing 12 includes a main body portion 20 and an arm 22. The main body portion 12 is made up of four plates: side plates 24 and 26; back plate 28 and top plate 30. These plates are joined in a conventional manner. For example, the plates can be metal and welded together. The main body portion can also be made of plastic by any known molding process. The main body portion 12 defines an inner space 32 opening on two sides within which the drive 14 is mounted. The arm 22 is preferably made of a material similar to that of the main body portion 12, and is connected at one end to the plate 24 of the main body portion 12. At its other end the arm 22 supports the wheel brake block 16.

The drive 14 includes in its essential elements a drive wheel 34, a friction wheel 36, an idler roller 38 and a gear set including meshing gears 40 and 42, mounted respectively to the drive wheel 34 and the friction wheel 36. The drive wheel 34 has its mounting shaft extending outwardly from the side plate 24 to which the power source 18 is connected. The drive wheel 34 has an outer surface which is preferably nurled, and the friction wheel 36 has preferably an outer elastomer covering. An input drive torque is applied to the drive wheel 34 by the power source 18 and this drive torque is imparted to the friction wheel 36 by the meshing gears 40, 42.

Wheel brake block 16 includes a surface 44 which is inclined with respect to the operating surface, i.e., the surface along which the vehicle is to be moved. The distance between the closest point on the outer surface of the idler roller 38 to the wheel brake block 16 and the front surface 46 of the wheel brake block 16 is greater than the corresponding points of engagement of the idler roller 38 and the surface 44 on the wheel of the wheeled vehicle. In this way, the apparatus 10 can easily straddle the intended areas of engagement on the wheel of the wheeled vehicle. From the straddle position the apparatus 10 can easily be brought into its operative position for driving the wheel of the wheeled vehicle. Preferably, the block 16 is made of wood, although any other material suitable for the purpose can be used.

Figure 2:
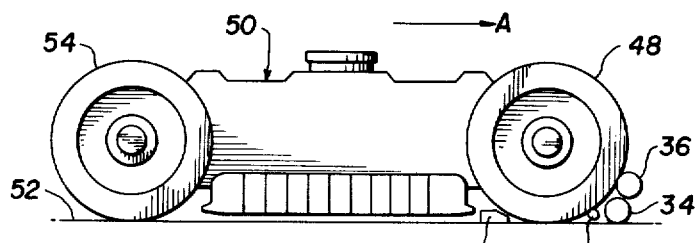
FIG. 2 is a schematic view illustrating the essential drive elements and idler roller without the transmission gears in engagement with the vehicle undercarriage.

Turning now to FIG. 2, the apparatus 10 is shown with the drive 14 in engagement with the wheel 48 of an under-carriage 50 which is resting on a track including a rail 52. Note the clearance between the wheel brake block 16 and the wheel 48 during engagement of the drive 14 with the wheel 48. According to the invention the drive wheel 34 engages the rail 52, while the friction wheel 36 and idler roller 38 engage the wheel 48. In the position shown the undercarriage 50 is being moved in the direction of the arrow A. To move in the opposite direction, it would be necessary to remove the apparatus 10 from engagement with the wheel 48, and reverse its position relative to wheel 48 assuming that sufficient clearance exists. Alternatively, the apparatus 10 can engage the wheel 54 or any of the other wheels.

In order to reverse the position of the apparatus 10 relative to the wheel 48, mounting shaft of the drive wheel 34 extends outwardly from the side plate 26 as well so that the power source 18 can be connected to the drive wheel.

Figure 3:
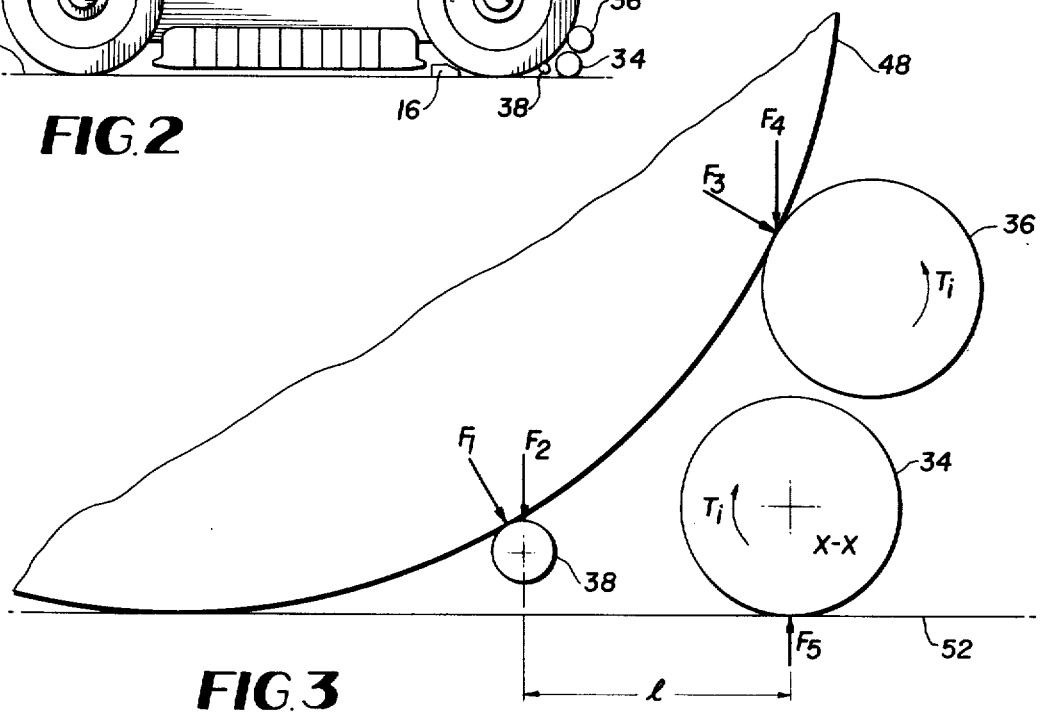
FIG. 3 is a schematic enlarged view of the drive wheel, friction wheel and idler roller along with the vehicle wheel engaged by the friction wheel and idler roller.

Turning to FIG. 3 for a discussion of the forces involved, the power source 18 imparts an input drive torque Ti to the drive wheel 34. This torque is imparted to the friction wheel 36 by the gear set 40, 42 (not shown in FIG. 3). The transmission ratio is preferably 1:1. The torque Ti tends to rotate the apparatus 10 about the axis X—X (the longitudinal axis of the drive wheel 34). This tendency to rotate the apparatus 10 produces the engagement of the idler roller 38 and the wheel 48, which in turn produces the reactive force $F_1$ with vertical component $F_2$. The reactive torque $F_2$ neutralizes the noted tendency to rotate the apparatus 10. Without the idler roller 38, the reactive torque would have to be supplied by the operator, and when moving rail cars of the above-noted weight, such a reaction becomes almost impossible.

The input torque Ti imparted to the friction wheel 36 produces a reaction force $F_3$ from the wheel 48, the vertical component $F_4$ of which, together with the force $F_2$ determine the magnitude of the normal force $F_5$ against the drive wheel 34. The frictional forces between the drive wheel and its engaged surface and the friction wheel and its engaged surface in turn depend on the magnitude of the respective normal forces and the coefficient of friction of the surfaces. It can be seen that the greater the resistance to motion, the greater the driving torque required, the greater the normal forces, the greater the frictional forces. In this regard the idler roller 38 has a smooth surface so that the friction force is negligible.

The drive wheel 34, friction wheel 36 and idler roller 38 constitute what we call a "rolling wedge" which drives the wheeled vehicle without interruption.

To stop the movement of the wheeled vehicle, the input torque is removed, and preferably the wheel brake block 16 is moved into engagement with the wheel 48. To move the apparatus 10 so that the surface 44 engages the wheel 48, a handle (not shown) can be used. Preferably the handle could be detachably mounted to the main body portion 30, for example, to the side plates 24, 26 or to the back plate 28 in a conventional manner.

SUMMARY OF ADVANTAGES AND SCOPE OF THE INVENTION

From the above description it can be seen that an apparatus has been disclosed which achieves its objects. It is lightweight and therefore portable (present weight is approximately 21 lbs.); it is compact in size so that it can be operated in confined spaces not accessible to larger equipment; it is easy to position for operation and remove from its operative position; it is easily manufactured; requires a minimum amount of maintenance; and is accessible for maintenance.

Although the apparatus 10 was developed for use in moving tracked vehicles on an assembly line, its application extends beyond such use. To provide a capability to handle vehicles with larger or smaller wheel sizes, the arm 22 can be designed to telescope in order to effect the straddling operation noted above. Once the position is set, it can be locked in position for operation. If the apparatus is intended to move lighter vehicles, for example, compact automobiles, the apparatus can be modified to provide for manual operation. In this case the power source would be replaced by a manually controlled extension which would be connected to the shaft extension of the drive wheel 34. The manual control could comprise an arrangement similar to the manual input disclosed in the Durbin et al U.S. Pat. No. 1,712,334, with the rack and pinion arrangement housed externally of the housing 12 and the manually developed input torque being applied to the drive wheel 34 through the connection to the shaft extension of the drive wheel.

Also, the power source 18 can be of any conventional class, such as electrical, for example.

What is claimed is:

1. An apparatus for moving a wheeled vehicle along a surface, comprising
   (a) a housing;
   (b) drive means mounted to the housing for engaging a wheel of the wheeled vehicle and the surface along which the wheeled vehicle is moved;
   (c) torque generating means engageable with the drive means for imparting a driving torque to the drive means, thereby producing rotation of said wheel of the wheeled vehicle for movement of the vehicle along said surface; and
   (d) torque reacting means mounted to the housing for engaging said wheel of the wheeled vehicle and producing thereby a reaction force for the apparatus sufficient to react the driving torque imparted to the drive wheel.

2. The apparatus as defined in claim 1, further comprising:
   (e) a wheel brake mounted to the housing for engaging said wheel of the wheeled vehicle, with the relative mounting on said housing of the wheel brake and the drive means being such that the brake engages said wheel of the wheeled vehicle when the drive means is disengaged therefrom.

3. The apparatus as defined in claim 2, wherein the wheel brake comprises a block having a surface for engaging said wheel of the wheeled vehicle, said surface being inclined relative to the surface along which the wheeled vehicle is moved.

4. The apparatus as defined in claim 3, wherein the housing comprises a main body portion within which the drive means are mounted, and an arm extending from the main body portion at the free end of which the wheel brake block is mounted.

5. An apparatus for moving a wheeled vehicle along a surface, comprising:
 (a) a housing;
 (b) a drive wheel mounted to the housing for engaging the surface along which the wheeled vehicle is moved;
 (c) torque generating means engageable with the drive wheel for imparting a driving torque to the drive wheel, thereby producing rotation of the drive wheel and movement of the apparatus along said surface;
 (d) a friction wheel mounted to the housing for engaging a wheel of the wheeled vehicle;
 (e) transmission means mounted to the housing and connected to the drive and friction wheels for transferring the driving torque to the friction wheel, thereby producing rotation of the friction wheel and said wheel of the wheeled vehicle for movement of the vehicle along said surface; and
 (f) an idler roller mounted to the housing for engaging said wheel of the wheeled vehicle and producing thereby a reaction force for the apparatus sufficient to react the driving torque imparted to the drive wheel.

6. The apparatus as defined in claim 5, further comprising:
 (g) a wheel brake mounted to the housing for engaging said wheel of the wheeled vehicle, with the relative mounting on said housing of the wheel brake, the friction wheel and the idler roller being such that the brake engages said wheel of the wheeled vehicle when the friction wheel and idler roller are disengaged therefrom.

7. The apparatus as defined in claim 6 wherein the wheel brake comprises a block having a surface for engaging said wheel of the wheeled vehicle, said surface being inclined relative to the surface along which the wheeled vehicle is moved.

8. The apparatus as defined in claim 7, wherein the housing comprises a main body portion within which the drive wheel, friction wheel, idler roller and transmission means are mounted, and an arm extending from the main body portion at the free end of which the wheel brake block is mounted.

9. The apparatus as defined in claim 5, wherein the transmission means includes a gear set comprising a gear mounted to each of the drive wheel and friction wheel.

10. An apparatus for moving a wheeled vehicle along a track with which it is engaged, comprising:
 (a) a housing;
 (b) a drive wheel mounted to the housing for engaging a rail of the track;
 (c) torque generating means engageable with the drive wheel for imparting a driving torque to the drive wheel, thereby producing rotation of the drive wheel and movement of the apparatus along said rail;
 (d) a friction wheel mounted to the housing for engaging a wheel of the wheeled vehicle;
 (e) transmission means mounted to the housing and connected to the drive and friction wheels for transferring the driving torque to the friction wheel, thereby producing rotation of the friction wheel and said wheel of the wheeled vehicle for movement of the vehicle along said track;
 (f) an idler roller mounted to the housing for engaging said wheel of the wheeled vehicle and producing thereby a reaction force for the apparatus sufficient to react the driving torque imparted to the drive wheel; and
 (g) a wheel brake mounted to the housing for engaging said wheel of the wheeled vehicle, with the relative mounting on said housing of the wheel brake, the friction wheel and the idler roller being such that the brake engages said wheel of the wheeled vehicle when the friction wheel and idler roller are disengaged therefrom.

11. The apparatus as defined in claim 10, wherein the wheel brake comprises a block having a surface for engaging said wheel of the wheeled vehicle, said surface being inclined relative to the top surface of the rail.

12. The apparatus as defined in claim 11 wherein the housing comprises a main body portion within which the drive wheel, friction wheel, idler roller and transmission means are mounted, and an arm extending from the main body portion at the free end of which the wheel brake block is mounted.

13. The apparatus as defined in claim 10 wherein the transmission means includes a gear set comprising a gear mounted to each of the drive wheel and friction wheel.

* * * * *